Oct. 14, 1952 — A. LYSHOLM — 2,613,500
GAS TURBINE POWER PLANT HAVING MEANS FOR JOINT
CONTROL OF THE FUEL AND THE AIR SUPPLY
Filed June 12, 1946 — 4 Sheets-Sheet 1

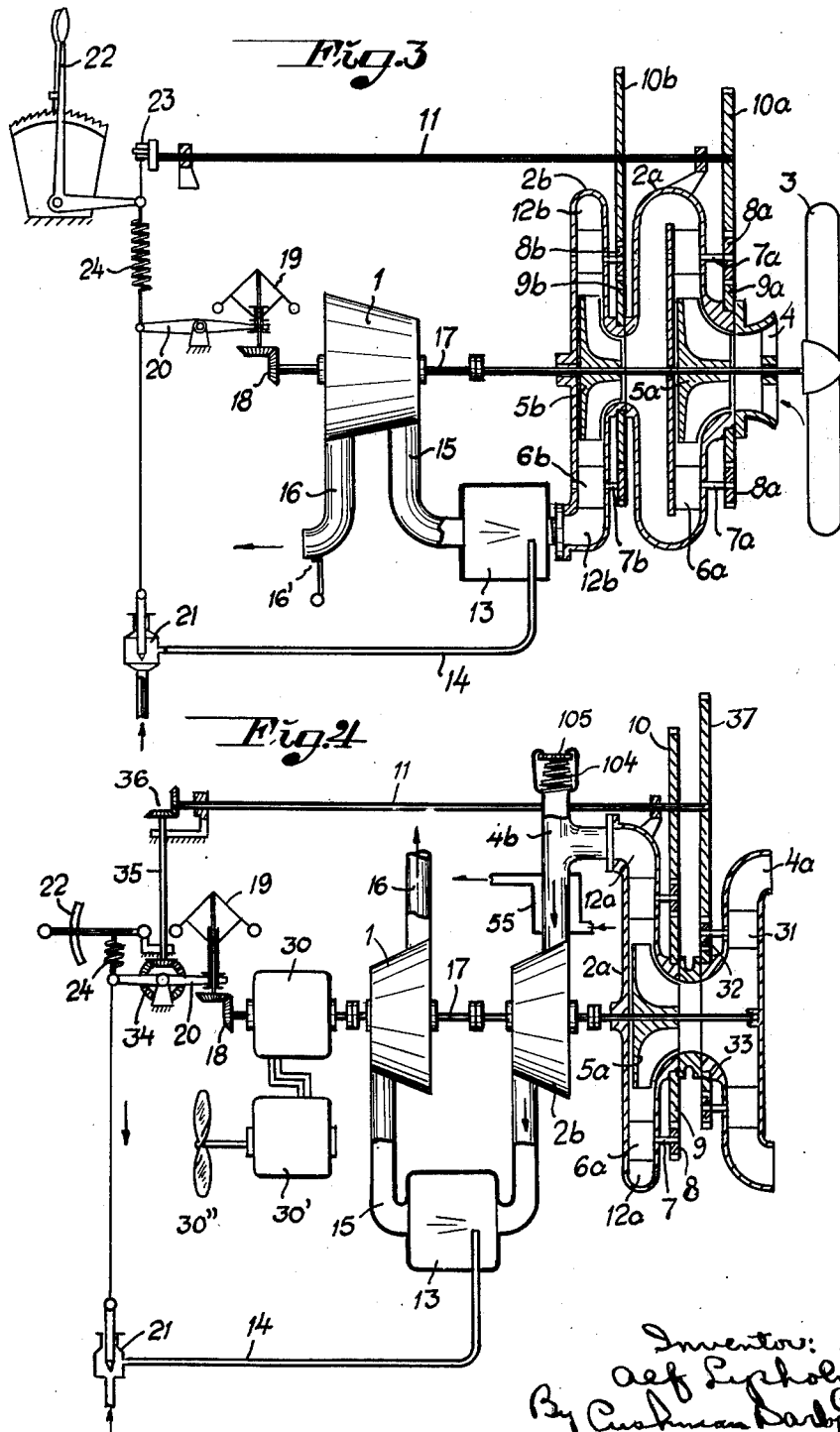

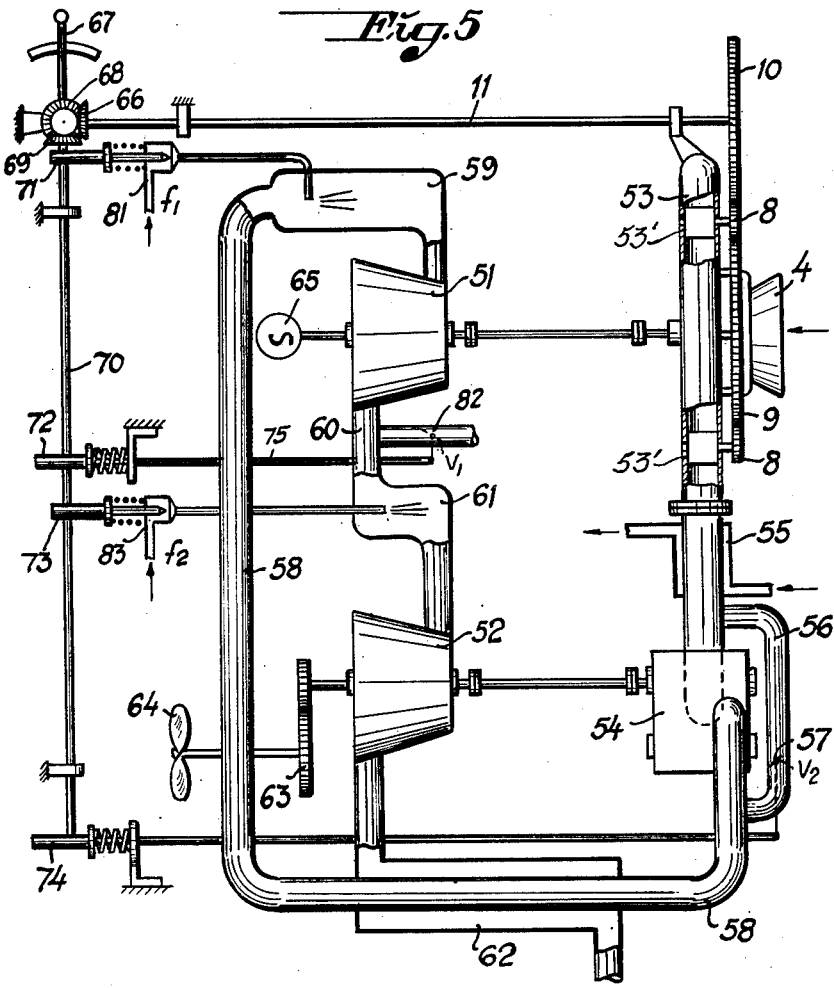
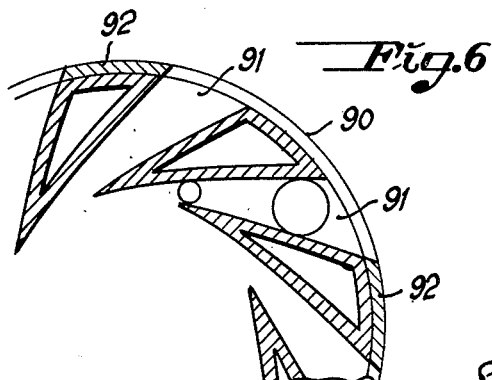

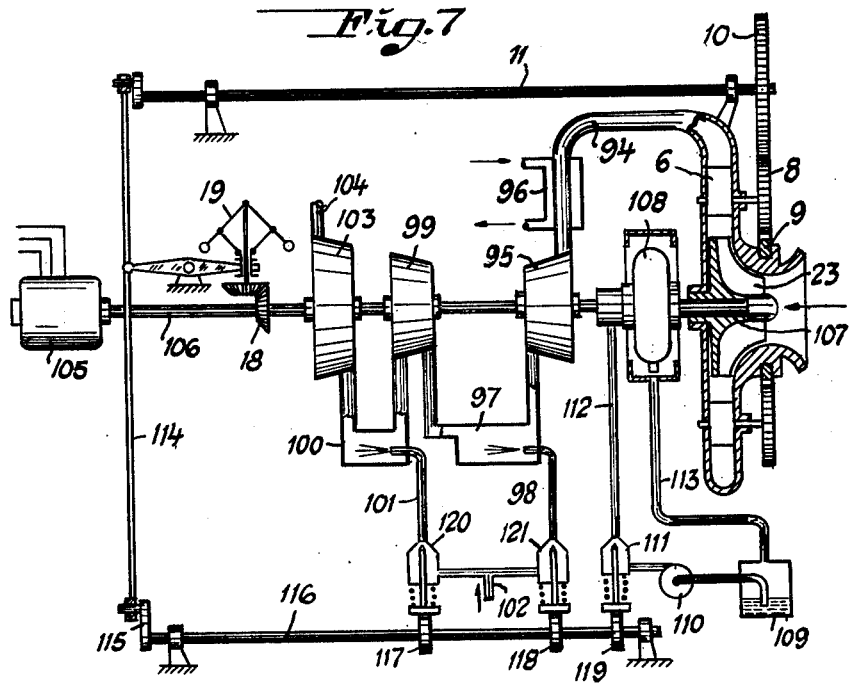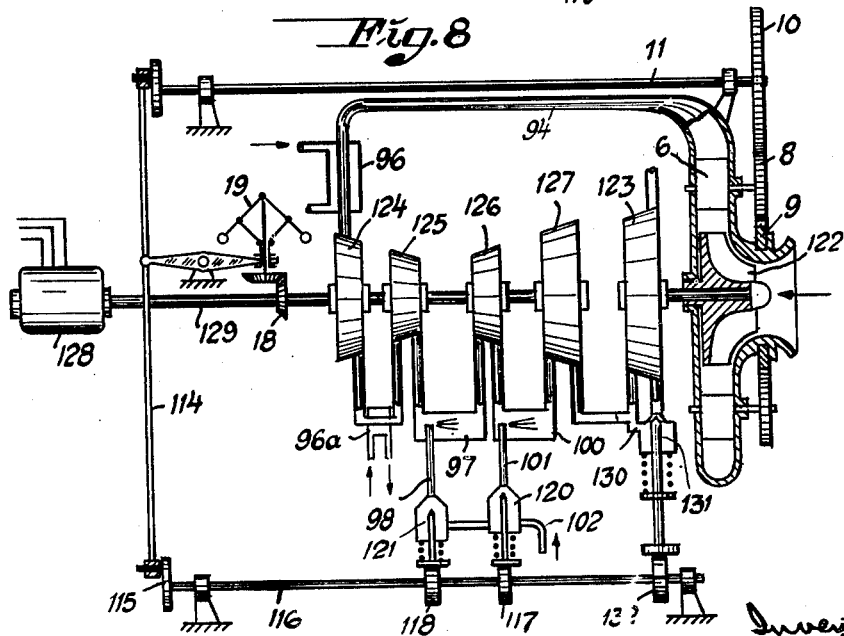

Patented Oct. 14, 1952

2,613,500

UNITED STATES PATENT OFFICE 2,613,500

GAS TURBINE POWER PLANT HAVING MEANS FOR JOINT CONTROL OF THE FUEL AND THE AIR SUPPLY

Alf Lysholm, Stockholm, Sweden

Application June 12, 1946, Serial No. 676,312
In Sweden June 22, 1945

4 Claims. (Cl. 60—39.27)

The present invention relates to a gas turbine power plant having at least one centrifugal compressor driven by a gas turbine and in which the air quantity as well as the fuel quantity are controlled, in order to adapt the plant to varying operating conditions.

Owing to its characteristic, a centrifugal compressor is not generally suitable to be used in gas turbine power plants in which it is driven by a gas turbine. The air quantity passing through the gas turbine is, at constant temperature, substantially proportional to the pressure and independent of the speed, whereas the pressure of the air delivered by the centrifugal compressor is substantially proportional to the square of the speed. Therefore it follows that at variations of the speed, disturbances will occur in the form of decreased efficiency and risk for surging or "pumping." In partial load control at constant compressor speed, the centrifugal compressor is likewise unsuitable, since in this case temperature control must be applied which is very uneconomical except for the control for reactive propulsion, such as for aircraft.

The invention has for its object to provide means to render possible an effective partial load control of the gas turbine and in the most favourable manner to adapt the quantity of air at all operating conditions of the turbine both with respect to the efficiency of the compressor and the desired temperature of the combustion gases without any risk for the compressor to operate in that range which usually is termed the surging or pumping range.

Figure 1:
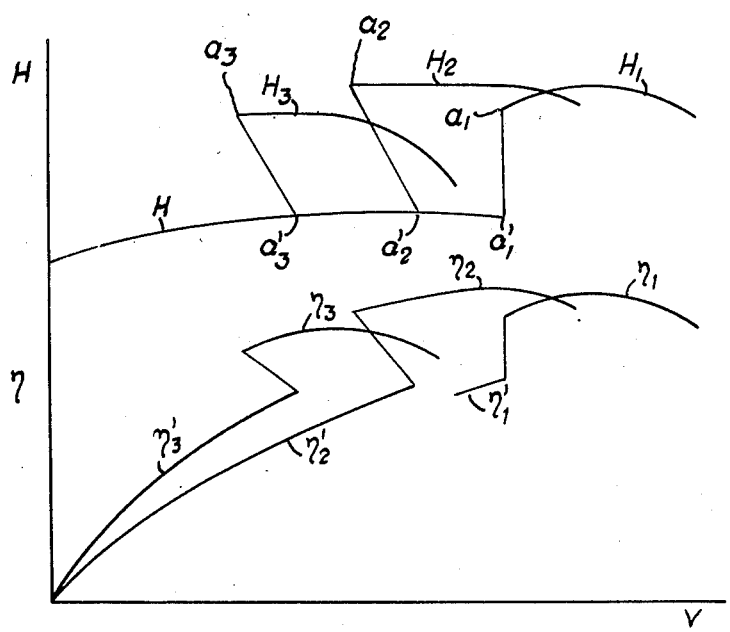
Figure 2:
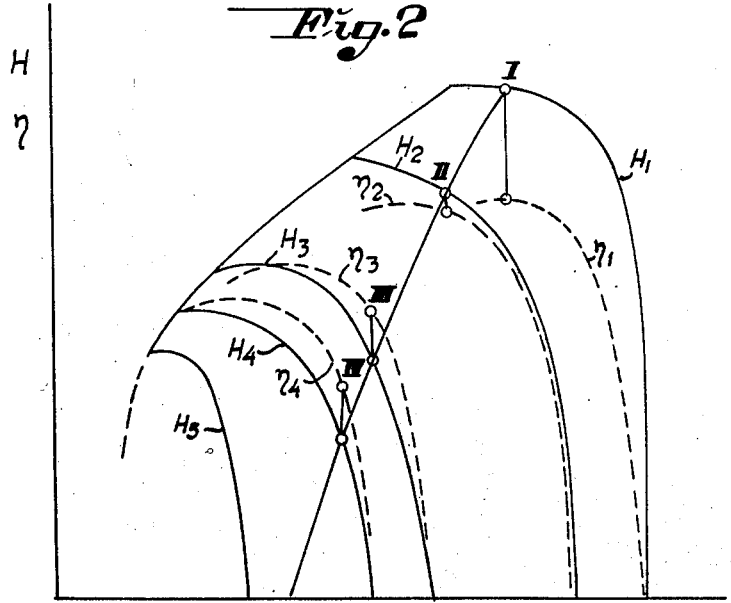

This object and further objects are attained by mechanism illustrated in the accompanying drawings in which:

Figs. 1 and 2 show diagrams representing the relation between pressure, volume and efficiency of a centrifugal compressor which is provided with guide vanes at the outlet and inlet, respectively. Fig 3 shows diagrammatically an embodiment of the invention as applied to a gas turbine power plant for the propulsion of aircraft. Fig. 4 illustrates a similar plant devised for substantially constant or slightly varying speed, which may be used, for instance, as a prime mover for an electric generator. Fig. 5 shows a gas turbine power plant for the propulsion of a ship. Fig. 6 illustrates a detail of the outlet of a centrifugal compressor provided with a rotary valve. Figs. 7 and 8 illustrate two modifications of a gas turbine power plant devised for substantially constant speed.

In the diagram shown in Fig. 1, the curves $H_1$, $H_2$ and $H_3$ represent pressures as functions of the volume in three different positions of the adjustable guide vanes in the outlet of a centrifugal compressor, while the curves $\eta_1$, $\eta_2$ and $\eta_3$ represent the corresponding efficiency curves. As will be seen from the diagram, throttling of the outlet area prevents the centrifugal compressor from operating, at a decrease of the volume of air, in the pumping range characteristic to such compressors. The lower limit values of the pumping range are indicated at $a_1$, $a_2$, $a_3$ and the upper limit values at $a'_1$, $a'_2$, and $a'_3$. As will be seen, the efficiency can at the same time be maintained at a relatively high and substantially constant level.

In the diagram illustrated in Fig. 2, the curves $H_1$—$H_5$ represent pressures as functions of the volume in different positions of rotary guide vanes provided at the inlet of a centrifugal compressor, whereas the curves $\eta_1$, $\eta_2$ . . . etc. represent the corresponding efficiencies. The points corresponding to the pumping range limits of the various curve are interconnected by the line $b$. It will be evident that upon throttling of the compressor inlet the pressure as well as the volume will be reduced, and the operating points on the various H-curves are located at satisfactory distances from the pumping range limit. However, the efficiency will be rapidly decreased at a decrease of the air quantity.

It will be seen that the most favourable possibilities of control will be obtained by the use of controlling means for the inlet as well as the outlet of the compressor. For instance, after having attained the most suitable H-curve by controlling the inlet in accordance with Fig. 2, the compressor can be adjusted, by control of the outlet, to that operating point on the curve in question, which corresponds to the highest efficiency. It should be noted, however, that control merely by means of the inlet guide vanes is, in spite of variations of the compressor efficiency, to be preferred to the use of an uncontrolled centrifugal compressor.

The above described possibilities of control by means of adjustable guide vanes or equivalent means in conjunction with centrifugal compressors result in especially great advantages, if the centrifugal compressor is used in connection with a gas turbine power plant, the method of control being dependent upon the purpose and arrangement of the gas turbine power plant.

In Fig. 3, there is illustrated a gas turbine power plant for the propulsion of aircraft. The plant comprises a turbine 1, two centrifugal compressors 2a and 2b arranged in series with each other, and a propeller 3, all of these parts being mounted on a common shaft 17. The air inlet of the low pressure compressor 2a is indicated at 4, and the compressor wheels which are preferably provided with radial blades are denoted at 5a and 5b. Radially outwardly of the compressor wheels, there are provided adjustable guide vanes 6a and 6b, which are mounted on shafts 7a and 7b, respectively, provided with gear wheels 8a and 8b, respectively. These gear wheels cooperate with gear wheels 9a and 9b, respectively, arranged concentrically with respect to the shaft 17. The gear wheels 9a and 9b are adapted to be rotated by one of the gear wheels 8a and 8b, respectively, driven by the gear wheels 10a and 10b, respectively, which are mounted on a control shaft 11.

In the embodiment shown, the gear ratio between the wheels 10a and 8a is lower than the ratio between the wheels 10b and 8b. As a result thereof, the outlet guide vanes 6a of the low pressure compressor 2a will be adjusted less than the outlet guide vanes 6b of the high pressure compressor 2b. This is suitable in such cases where the greatest portion of the output is taken out in the form of reactive effect. In prime movers in which the output is substantially absorbed by a propeller, the arrangement should be inverse, that is, the outlet guide vanes of the high pressure compressor should be adjusted less than those of the low pressure compressor and in an opposite direction, for instance by means of an intermediate gear wheel.

From the diffuser 12b located outwardly of the guide vanes 6b, the compressed air is supplied into a combustion chamber 13 into which fuel is injected through a conduit 14. The combustion gases pass through a pipe 15 to the inlet of the turbine, and the exhaust gases are discharged from the turbine through a pipe 16 provided with a control device 16'. In the embodiment shown, the propeller 3 is an auxiliary propeller. The greatest portion of the thrust is intended to be obtained by jet propulsion by means of the exhaust gases discharged through the pipe 16.

At the end of the common shaft 17, there is provided a toothed gear 18 for driving a centrifugal governor 19 which by means of a lever 20 actuates a diagrammatically indicated control valve 21 for the supply of fuel through the conduit 14 to the combustion chamber 13. The control shaft 11 for turning the guide vanes is adapted to be actuated by means of a control lever 22 and a crank 23.

The lever 20 is by means of a spring 24 connected with the transmission member between the control lever 22 and the crank 23. Upon adjustment of the control lever towards increased output, said spring is tensioned and acts upon the fuel valve 21 and the governor 19 in such a manner that the speed of the turbine will be increased. At the same time, the guide vanes 6a and 6b will be turned towards closing positions. In this way, the operating point of the compressor is adjusted to correspond to the quantity of the air passing through the turbine. At this point, the compressor operates with its best efficiency and without risk of pumping.

Fig. 4 shows diagrammatically a plant for driving an electric generator indicated at 30. This generator may be assumed to feed an electric motor 30' for the propulsion of a ship propeller 30'', in which case the turbine speed should vary in response to the load. Fig. 4 shows substantially the same devices which are represented in Fig. 3. In the present instance, however, the low pressure compressor 2a is provided with guide vanes at the outlet as well as at the inlet 4a. The adjustable guide vanes at the inlet of the compressor 2a are indicated at 31 and are controlled by means of gear wheels 32 which are cooperating with a common gear wheel 33. One of the gear wheels 32 also meshes with a gear wheel 37 mounted on the shaft 11. Due to this arrangement, the outlet and inlet guide vanes will be turned simultaneously so that the compressor can be operated with an efficiency as high as possible.

The high pressure compressor 2b is merely diagrammatically indicated in Fig. 4, and lacks inlet as well as outlet guide vanes. From the diffuser 12a air is supplied to an inlet pipe 4b for the high pressure compressor 2b and passes through an intermediate cooler 55. The inlet pipe 4b is further provided with a short conduit 104 adapted to be put into communication with the atmosphere. The end of said conduit is controlled by a spring-loaded valve 105 which automatically opens when the pressure in the inlet pipe 4b falls below the atmospheric pressure. Due to this arrangement, it is possible to put the low pressure compressor 2a entirely or substantially entirely out of operation at low loads, in which case the low pressure compressor is idling, while the main portion of the air quantity is drawn in through the conduit 104 and the main compressor work is performed by the high pressure compressor 2b.

When the plant described is intended to be operated at substantially constant speed, the lever 20 actuated by the centrifugal governor and connected with the fuel valve 21 is connected with a bevel gearing 34 which by means of a shaft 35 and a second bevel gearing 36 actuates the control shaft 11 for the adjustment of the guide vanes, the arrangement being such that upon increase of the speed the fuel quantity is reduced and the inlet guide vanes are turned towards closing positions so that an air vortex will occur in the compressor inlet, whereas the outlet guide vanes are opened. In addition thereto, the speed may be varied within certain limits by means of the control lever 22 which is connected with the lever 20 by means of the spring 24.

In Fig. 5, there is illustrated a gas turbine power plant for propulsion of ships. The plant comprises two gas turbines 51 and 52 arranged in series with each other. The high pressure turbine 51 drives a centrifugal compressor 53, whereas the low pressure turbine 52 drives a compressor 54 of the displacement type arranged in series after the centrifugal compressor 53. The compressor 53 is provided with the outlet guide vanes 6a and 6b previously described. Between the compressors there is provided a cooler 55. The displacement compressor 54 may be by-passed by means of a conduit 56 provided with a flap 57. From the displacement compressor, the air is supplied through a conduit 58 into a first combustion chamber 59 and hence to the high pressure turbine 51. The exhaust gases from the high pressure turbine pass through a conduit 60 into a second combustion chamber 61 and to the low pressure turbine 52. Before the gases are discharged into the atmosphere, they pass from the low pressure turbine through a heat exchanger 62 for heating the combustion air admitted to the first combustion chamber 59.

The low pressure turbine 52 is adapted to drive the propeller 64 by means of a gearing 63. A starting motor 65 is connected with the shaft of the high pressure turbine 51.

The centrifugal compressor 53 is provided with adjustable outlet guide vanes substantially as described with reference to Fig. 3. Each guide vane shaft carries a gear wheel 8 meshing with a common gear wheel 9 adapted to be rotated by a gear wheel 10 and one of the wheels 8. The gear wheel 10 is mounted on the control shaft 11 which through a bevel gear wheel 66 is connected with a bevel gear wheel 68 adapted to be turned by means of a control lever 67. The gear wheel 68 further meshes with a bevel gear wheel 69 mounted on a control shaft 70 which has mounted thereon four cams 71, 72, 73 and 74. The cam 71 is adapted to actuate a valve device 81 for the control of the fuel supply to the combustion chamber 59, whereas the cam 73 actuates a similar valve device 83 for the control of the supply of fuel to the combustion chamber 61. The cam 72 actuates, by means of a rod 75, a flap valve 82 in a branch conduit connected to the conduit 60 and opening into the atmosphere. Finally, the cam 74 actuates the flap valve 57 in the by-pass conduit 56 of the displacement type compressor 54.

At high load, both fuel valves 81 and 83 are open, whereas the flaps 57 and 82 are closed. At the same time, the adjustable guide vanes in the outlet of the compressor 53 are open. At low load, the main portion of fuel is injected into the combustion chamber 59, while the fuel valve 83 is closed or open to a small degree only. The outlet area of the centrifugal compressor 53 is gradually decreased at decreasing load, and at very low loads the displacement compressor 54 is put out of operation by opening the flap 57 in the by-pass conduit 56. During idling, the valve 81 is only partly open, valve 83 is closed, and both flaps 57 and 82 are open.

Fig. 6 illustrates by way of example a detail of an embodiment of a centrifugal compressor the outlet of which is provided with a rotary valve 90 instead of adjustable guide vanes for the control of the outlet area. The compressor outlet is devised with eight spirally shaped passages 91. Four of these passages can be closed by means of the rotary slide 90 which to this end is provided with four closing members 92.

Fig. 7 illustrates an embodiment of a gas turbine power plant suitable for driving an electric generator or other device at a substantially constant speed. Reference numeral 93 indicates a low pressure centrifugal compressor provided with adjustable guide vanes 6 at the outlet. By means of a conduit 94, the compressor 93 is arranged in series with a high pressure compressor 95, a cooling device 96 being provided for cooling the air flowing from the low pressure compressor to the inlet of the high pressure compressor. The air finally compressed is supplied into a combustion chamber 97 into which fuel is injected through a conduit 98. The combustion products are then admitted to a low pressure turbine 99 the outlet of which is connected to a second combustion chamber 100 into which fuel is supplied through a conduit 101. Numeral 102 indicates the common fuel supply pipe. After being reheated in the combustion chamber 100, the driving fluid enters a low pressure turbine 103 the exhaust gases of which are discharged through the outlet 104.

The high pressure compressor 95, both turbines 99 and 103 and an electric generator 105 are mounted on a common shaft 106, while the low pressure compressor 93 is mounted on a shaft 107 which is connected to the shaft 106 by means of a variable speed device, such as a hydraulic clutch diagrammatically indicated at 108. The clutch 108 is supplied with liquid, such as oil, from a tank 109 by means of a pump 110, a control valve 111 being inserted in the supply conduit 112. Through a conduit 113, liquid is returned from the hydraulic clutch to the tank 109. It will be evident that the power transmitted from shaft 106 to shaft 107 will increase as the quantity of liquid circulating through the system 109, 110, 111, 112, 108, 113 is increased when the cross-sectional area of valve 111 is increased. In this case, the low pressure compressor will be rotated at increased speed and will as a consequence deliver an increased quantity of compressed air to the high pressure compressor.

The guide vanes 6 are adjusted by means of gear wheels substantially in the same manner as described with reference to the embodiments illustrated in Figs. 3–5. By means of a rod 114 and a crank device 115, the centrifugal governor also acts upon a shaft 116 provided with cams 117, 118 and 119. The cams 117 and 118 actuate valves 120 and 121, respectively, for the control of the quantity of fuel supplied to the combustion chambers, while cam 119 actuates the valve 111 in the liquid circuit of the variable speed device 108.

In the present instance, too, a common control device 19 controls the positions of the adjustable guide vanes as well as the supply of fuel. In addition thereto, the common control device also controls the power input to the low pressure compressor by means of the variable speed device 108.

In the embodiment illustrated in Fig. 8, the low pressure compressor 122 is directly connected with a low pressure turbine 123. An intermediate pressure compressor 124, a high pressure compressor 125, a high pressure turbine 126, an intermediate pressure turbine 127, and an electric generator 128 are mounted on a common shaft 129. Between the intermediate pressure compressor 124 and the high pressure compressor 125, there is provided a second cooling device 96a. The valves 121 and 120 in the fluid supply conduits 98 and 101, respectively are again controlled by means of cams 118 and 117, respectively, mounted on the cam shaft 116 which in a similar manner as in the preceding embodiment is actuated by the centrifugal governor 19 by means of a control rod 114 which further acts upon the shaft 11 and the adjustable guide vanes 6.

Between the inlet and the outlet of the low pressure turbine 123, there is provided a by-pass conduit 130 which is controlled by means of a valve 131 actuated by a cam 132 which is mounted on the cam shaft 116. Through the conduit 130, driving fluid can be directly discharged into the outlet of the low pressure turbine 123 at full load when the low pressure compressor 122 may deliver an air quantity exceeding the quantity required at full load.

It will be apparent from the description of the preceding embodiments that in the modifications illustrated in Figs. 7 and 8, the control of the fuel supplied to the combustion chambers and the control of the adjustable guide vanes at the outlet of the low pressure compressor are associated with each other such as to secure the best efficiency at varying load conditions in combination with a corresponding control of the speed of the low pressure compressor by means of the variable speed device 108 or the by-pass control valve 131.

It will be understood that the invention is not limited to the embodiments and modifications illustrated and described.

What I claim is:

1. In a gas turbine power plant, a gas turbine, a centrifugal air compressor having an air inlet and an air outlet, means for mechanically connecting the air compressor with the turbine for driving the air compressor from the turbine at a constant ratio of speed, a combustion chamber, a conduit for supplying compressed air from said compressor to said combustion chamber, means for supplying fuel to said combustion chamber, a conduit for supplying combustion products from said combustion chamber to said turbine, means for controlling the quantity of fuel supplied to said combustion chamber, and vanes in the compressor, adjustable for controlling the throat area of the vanes for controlling the compressor characteristic, and operatively connected to said fuel means for joint control of the fuel supply and the said throat area, so that the compressor characteristic is automatically adapted to changed conditions as regards fuel supply, speed and load.

2. A gas turbine power plant as called for in claim 1 having adjustable diffuser vanes.

3. In a gas turbine power plant, a gas turbine, a centrifugal air compressor having an air inlet and an air outlet, means for mechanically connecting the air compressor with the turbine for driving the air compressor from the turbine at a constant ratio of speed, a combustion chamber, a conduit for supplying compressed air from said high pressure compressor to said combustion chamber, means for supplying fuel to said combustion chamber, a conduit for supplying combustion products from said combustion chamber to said turbine, means for controlling the quantity of fuel supplied to said combustion chamber, and vanes in the compressor, adjustable for controlling the throat area of the vanes for controlling the compressor characteristic, and operatively connected to said fuel means for joint control of the fuel supply and the said throat area, so that the compressor characteristic is automatically adapted to changed conditions as regards fuel supply, speed and load.

4. In a gas turbine power plant, a gas turbine, a centrifugal air compressor having an air inlet and an air outlet, means for mechanically connecting the air compressor with the turbine for driving the air compressor from the turbine at a constant ratio of speed, a combustion chamber, a conduit for supplying compressed air from said high pressure compressor to said combustion chamber, means for supplying fuel to said combustion chamber, a conduit for supplying combustion products from said combustion chamber to said turbine, means for controlling the quantity of fuel supplied to said combustion chamber, and vanes in the compressor, adjustable for controlling the throat area of the vanes for controlling the compressor characteristic, and operatively connected to said fuel means for joint control of the fuel supply and the said throat area, so that the compressor characteristic is automatically adapted to changed conditions as regards fuel supply, speed and load.

ALF LYSHOLM.

REFERENCES CITED

The following references are of record in the file of this patent:

UNITED STATES PATENTS

| Number | Name | Date |
| --- | --- | --- |
| 1,052,588 | Janicki | Feb. 11, 1913 |
| 2,115,112 | Lysholm | Apr. 26, 1938 |
| 2,238,905 | Lysholm | Apr. 22, 1941 |
| 2,322,987 | West | June 29, 1943 |
| 2,397,060 | Szydlowski | Mar. 19, 1946 |

FOREIGN PATENTS

| Number | Country | Date |
| --- | --- | --- |
| 515,469 | Great Britain | Dec. 6, 1939 |
| 659,211 | Germany | Apr. 28, 1938 |